US008680851B2

(12) United States Patent
Artinger

(10) Patent No.: US 8,680,851 B2
(45) Date of Patent: Mar. 25, 2014

(54) DEVICE FOR DETECTING METALLIC-CONDUCTING PARTS IN A CONVEYED FLOW

(75) Inventor: Manfred Artinger, Schönberg (DE)

(73) Assignee: Mesutronic Gerätebau GmbH, Kirchberg i. Wald (DE)

( * ) Notice: Subject to any disclaimer, the term of this patent is extended or adjusted under 35 U.S.C. 154(b) by 656 days.

(21) Appl. No.: 12/989,290

(22) PCT Filed: Apr. 22, 2009

(86) PCT No.: PCT/EP2009/002935
§ 371 (c)(1),
(2), (4) Date: Jan. 11, 2011

(87) PCT Pub. No.: WO2009/130019
PCT Pub. Date: Oct. 29, 2009

(65) Prior Publication Data

US 2011/0101976 A1 May 5, 2011

(30) Foreign Application Priority Data

Apr. 23, 2008 (DE) ......................... 10 2008 020 332

(51) Int. Cl.
*G01V 3/10* (2006.01)
*G01N 27/72* (2006.01)

(52) U.S. Cl.
USPC ............ 324/235; 324/238; 324/240; 324/233

(58) Field of Classification Search
USPC .................. 324/233, 239–243, 326, 235, 238
See application file for complete search history.

(56) References Cited

U.S. PATENT DOCUMENTS

| | | | | |
|---|---|---|---|---|
| 4,709,213 | A | 11/1987 | Podhrasky | |
| 5,187,723 | A | 2/1993 | Mueller-Stuercken | |
| 5,304,927 | A * | 4/1994 | Thomas et al. | 324/233 |
| 5,929,634 | A | 7/1999 | Artinger | |
| 2003/0164766 | A1 * | 9/2003 | Britton | 340/552 |
| 2008/0224704 | A1 * | 9/2008 | Westersten | 324/326 |

FOREIGN PATENT DOCUMENTS

| | | |
|---|---|---|
| DE | 3714009 | 11/1988 |
| DE | 4017780 | 12/1991 |
| DE | 19521266 | 2/1997 |
| DE | 43 42 826 | 5/1998 |

OTHER PUBLICATIONS

International Search Report, PCT International Patent Application No. PCT/EP2009/002935, dated Oct. 1, 2009.

* cited by examiner

*Primary Examiner* — Jay Patidar
(74) *Attorney, Agent, or Firm* — Kenyon & Kenyon LLP

(57) ABSTRACT

A facility for generating a detection signal upon the presence of metallic-conductive parts in a conveyed flow that is at least largely non-conductive, in which, for example, an alternating electromagnetic field is established in a section of the conveyed flow to be monitored by means of an alternating current generator and a transmitter coil system, whereby a variation of the signal of said field that is triggered by passage of a part is detected by a receiver coil system and converted into a detection signal by an analytical circuit. The individual components of the system are distributed over separate circuit modules which in turn act in concert by means of a bus system.

10 Claims, 2 Drawing Sheets

G
OT
A
AL
UT
SL
M
F
B

Hall Generators
Common Housing
I' II' III'
g
e
x y z
Bus
Magnetic Field Plates
Housing
Common Housing

DEVICE FOR DETECTING METALLIC-CONDUCTING PARTS IN A CONVEYED FLOW

FIELD OF THE INVENTION

The present invention relates to a facility for generating a detection signal upon the presence of metallic-conductive parts in a conveyed flow that is at least largely non-conductive.

BACKGROUND INFORMATION

Facilities of this type usually work such that an alternating electromagnetic field is established in a section of the conveyed flow to be monitored by means of an alternating current generator and a transmitter coil system, whereby a variation of the signal of said field that is triggered by passage of a part is detected by a receiver coil system and serves, in conjunction with a downstream analytical circuit, for derivation of a detection signal which then triggers an information and/or elimination of said part. Facilities of this general type are described in terms of their application and structure, for example, in German Patent Application Nos. 37 14 009 A1 and 40 17 1 780 A1 and the references described therein. In this context, the detection signal serves for actuation of protective facilities, such as an optical and/or acoustic signaling device, of shut-off facilities of the conveying facility or for deviation of a conveyed flow containing an interfering part into a collection vessel or the like. In this context, the individual system components, such as a sensor unit, an analytical circuit, a sequence control system, etc., are usually combined into a module and electrically connected to each other by means of a wiring system. In case of a disturbance being present, this renders not only the troubleshooting more difficult, but also impedes flexibility in case the overall facility is to be adapted to changed working conditions.

SUMMARY

In accordance with the present invention, a facility is provided for generating a detection signal upon the presence of metallic-conducting parts in a conveyed flow that is at least largely non-conductive, in which facility variations of the magnetic field caused in a monitoring section by the parts are detected by means of a sensor unit and guided to an associated analytical unit for derivation of a detection signal that triggers an information and/or elimination of said part, and in which the individual system components are combined into modules, in that a first circuit module is provided which comprises the sensor unit and the digital-type analytical circuit, which in turn is designed such that it emits a detection signal only upon passage of a part, in that a second circuit module is provided to which the detection signal from the first circuit module is supplied as input signal and on which is arranged a control center that serves for control signal and information exchange, in that a third circuit module is provided to which the detection signal from the first circuit module is supplied as input signal and which comprises a display facility including associated control unit for the display and the setting of the operating status of the overall facility, in that a bus system, preferably an Ethernet system, is provided, and in that the individual circuit modules with appropriate connections for said bus system are provided and are connected by an arrangement thereof for the exchange of setting and information signals.

In a facility for generating a detection signal for of metallic-conductive parts in a conveyed flow that is at least largely non-conductive, in which the sensor unit contains an alternating current generator which establishes via a transmitter coil system an alternating electromagnetic field in a section of the conveyed flow, which is to be monitored, whereby the variations of said alternating electromagnetic field that are triggered upon passage of a part are detected by a receiver coil system and supplied to the analytical circuit for derivation of a detection signal, the first circuit module comprises the alternating current generator that serves to supply the coils, the receiver for the coil signals, and the analytical circuit that is of a digital type. In this context, it is advantageous if the first circuit module is arranged inside the coil housing, preferably in a housing that is accessible from outside and can be sealed. In this context, it is also advantageous if all circuit modules are arranged in a common device housing that is specifically dedicated to the coils.

If the facility for generating a detection signal upon the presence of metallic-conductive parts in a conveyed flow that is at least largely non-conductive works with a passive sensor, mainly made of Hall generators or field plates, when the first circuit module comprises the passive sensor unit and the digital-type analytical circuit.

One development of the present invention includes the second circuit module and the third circuit module being arranged in one device housing. It may be expedient to provide the display facility as a display featuring touch-fields as control keys or setting keys. In a particular development of the facility according to the present invention, each circuit module is provided with its separate control module (controller) for the setting of those components of the circuit module that can be set from the control center by means of the bus system.

If the bus connection between the circuit modules is provided in the form of a cable connection, it may be advantageous for said connection to also contain conductors for supplying power to the individual circuit modules in addition to the actual bus cable.

BRIEF DESCRIPTION OF THE DRAWINGS

Example embodiments of the present invention are illustrated in more detail below. For a clearer understanding of the present invention, the figures first used to illustrate the principle and basic set-up wiring diagram of a metal detection device of the type mentioned by means of FIGS. 1 to 6. This presentation is described, for example, in German Patent Application No. 43 48 826 C2. Subsequently, the distribution of the individual components to the individual circuit modules and their connection to each other and other components, as provided by the present invention, is considered based on FIGS. 7 to 10.

DETAILED DESCRIPTION OF EXAMPLE EMBODIMENTS

Figure 1:
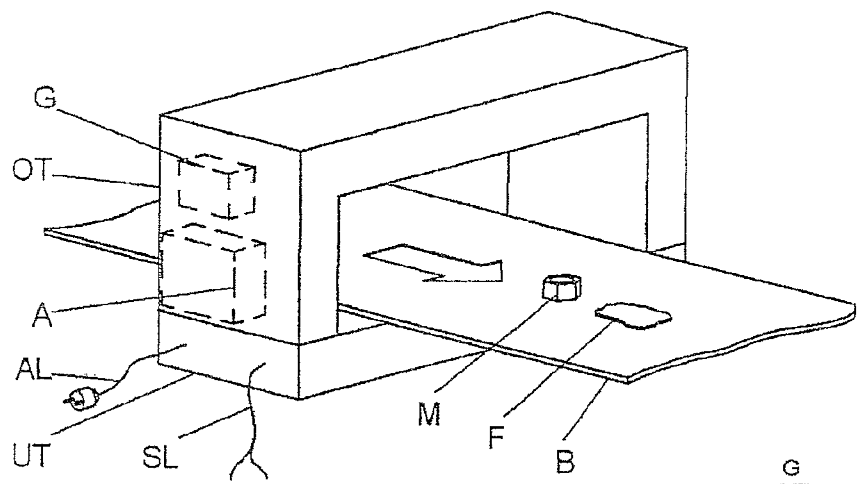
FIG. 1 shows a view of a metal detection facility that surrounds a conveyor belt.
Figure 2:
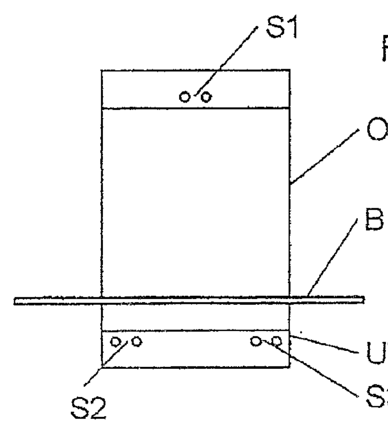
FIG. 2 shows a section through a metal detection facility according to FIG. 1.

The facility shown schematically in FIGS. 1 and 2 consists of two components OT and UT, one of which is provided to be U-shaped and the other as a flat support. The two components surround a conveyor belt B that transports the goods to be checked for the presence of undesired metallic parts through the facility in the direction of the arrow shown. A transmitter coil S1 is arranged in said component OT. Moreover, a generator G supplying alternating current to the transmitter coil and a circuit A for derivation of a detection signal from metallic-conductive parts that are present in the conveyed goods are arranged in the part OT. Two receiver coils S2 and S3, staggered with respect to each other in the direction of conveying, are arranged in the support UT. The embodiment and arrangement of the coils as well as the shape of the housing and the shape and type of the through-opening are matched to the application on hand in a generally conventional fashion. By means of contacts that are not shown in any detail here, their connections are guided to a circuit module A in the component OT. A connection lead AL serves to connect the facility to the operating current supply. An output lead SL serves to conduct a detection signal ES triggered by a part to be detected to one of the protective devices mentioned above.

Figure 3:
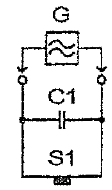
FIG. 3 shows a wiring diagram including the transmitter coil and a coil system for reception that comprises two coils.
Figure 3:
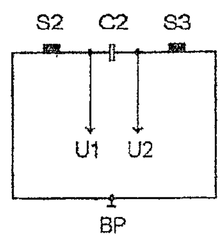

As shown in FIG. 3, a capacitor C1 and a capacitor C2 are added to the transmitter coil S1 and the pair of coils S2, S3, respectively, to complete an electrical resonant circuit each. The two resonant circuits S1, C1 and S2, S3, C2 are matched such that they form a band filter matched to the frequency of the alternating current that is supplied by the generator G. Splitting the coil, and therefore the inductance in the oscillating circuit S2, S3, C2, allows for tapping of signals U1 and U2 that are 180° out of phase with respect to the reference potential BP and supplying them to the analytical circuit A.

Figure 4:
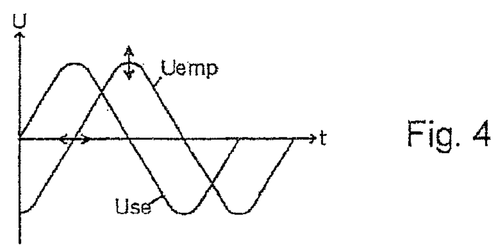
FIG. 4 shows a swing diagram for illustration of the effect of conductive parts in the conveyed goods flow on the signal detected by means of the coil system.

FIG. 4 illustrates the influence of passage of a metallic-conductive part that is moved past the coils S2 and S3 by the conveyor belt. The eddy currents caused by the alternating field of the coil vary both the amplitude and the phase angle of the signal Uemp that is received by means of S2 and S3, which, in the absence of such field variations is phase-shifted by 90° with respect to Use. The variations are indicated by arrows. The variation in amplitude and in phase is analyzed by means of AZ and PZ, respectively.

Figure 5:
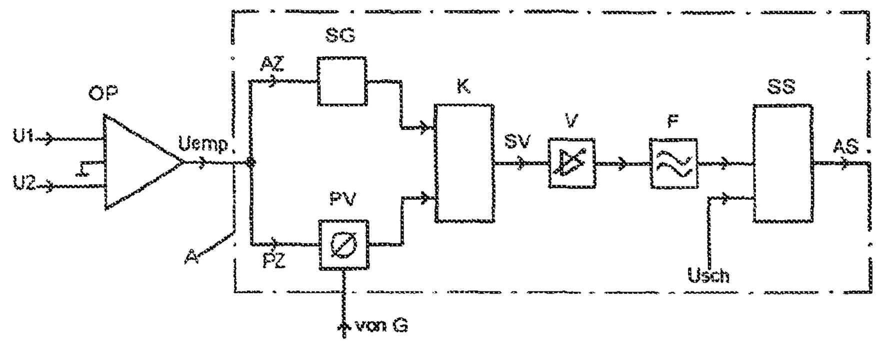
FIG. 5 shows the block diagram of a circuit for derivation of a detection signal.

As shown in FIG. 5, circuit A begins with a difference amplifier OP that is formed by a so-called operational amplifier, serving as receiver, at the output of which a split into an amplitude branch AZ and a phase branch PZ is effected. In amplitude branch AZ, a rectifier module SG is used to determine the peak value of the signal Uemp. A phase discriminator PV, which is supplied with the signal Use of the generator G as phase reference signal, is incorporated in the phase branch PZ. The output voltages of SG and PV are supplied to a comparator K with variable weighting. In the simplest case, this is a subtractor featuring an amplitude controller in at least one of its two inputs.

The output signal of the comparator K is supplied via a filter F, possibly after amplification in an amplifier V, to a threshold circuit SS at the output of which the detection signal AS of a metallic-conductive part to be classified as a disturbance can be tapped. For this purpose, a variable reference voltage Usch is supplied to the threshold circuit SS such that the detection signal AS is present at the output of SS if said reference voltage is exceeded. The filter F suppresses the direct voltage portion in the output of K and limits the frequency spectrum to the range intended for the analysis. During the transport of a metallic-conductive part through the facility described above according to FIGS. 1 to 4, a signal is present at the input of V and/or SS that shows an amplitude profile that is characteristic of the moved part. If the part is short with respect to the distance between the coils S2 and S3, each passage of one of the coils leads to the generation of a signal like the one denoted Sig.1 in FIG. 6. In contrast, if the part is long by comparison, the profile of AS corresponds approximately to Sig.2.

Figure 6:
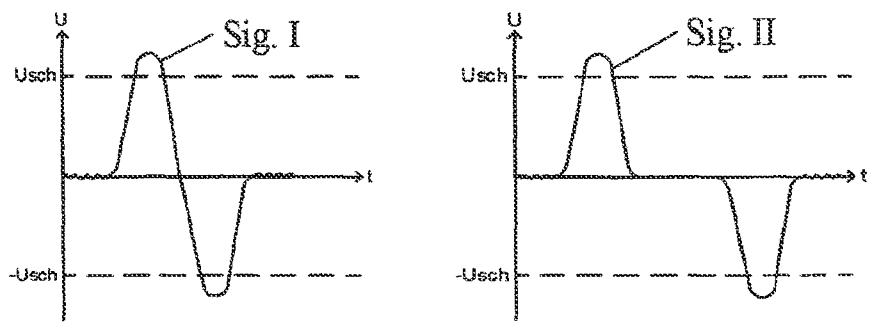
FIG. 6 shows the time course of the signal that occurs upon the passage of a metallic-conductive part at the output of a threshold circuit that serves for emission of the detection signal.

FIG. 6 shows the effect of the reference voltage Usch in the threshold circuit SS. An output signal AS that serves as the detection signal is present only if the threshold values are exceeded. Threshold circuits of this type are generally conventional. The threshold circuit also effectively suppresses the influence of background noise, which is indicated in FIG. 6 to precede and following the actual signals.

The section of the circuit from the output of OP to the output of SS basically forms the analytical circuit.

The facility according to FIG. 1 uses a coil system consisting of two coils on its secondary side. It is also feasible to work with just one coil in generally conventional fashion. Moreover, it is feasible to dispense with the generator in some cases. For example in the testing of cogwheels for uniformity of the individual cogs, in which the rotation of the cogwheel is used to derive a corresponding oscillation in a separate module and relating it, by means of a coil or optically, to the metallic, usually ferromagnetic, cogwheel cogs gliding past, comparable conditions are obtained.

The processing of the signals Use and Uemp in older plants is usually effected by means of so-called analog-type modules. If these signals are converted into digital signals by analog-to-digital converters prior to processing them in the analytical circuit, the processing can proceed on a digital basis. The corresponding building blocks, such as a comparator K that is usually provided as a subtractor, an amplifier V, a filter, and a threshold circuit, are known as ICs in the trade and are commercially available.

As shown in FIG. 5, the analytical circuit A begins downstream from the difference amplifier OP that is formed by a so-called operational amplifier and serves as receiver, at the output of which difference amplifier OP a split into an amplitude branch AZ and a phase branch PZ is effected. In amplitude branch AZ, a module SG is used to determine the absolute value of the signal Uemp which represents the amplitude variation signal. A phase discriminator PV which is supplied with the signal Use of the generator G as phase reference signal is incorporated in the phase branch PZ. The phase variation signal is applied to the output of PV.

The influence of the passage of a metallic-conductive part that is moved past the coil S2 by the conveyor belt is shown schematically in FIG. 6. The eddy currents caused in the part by the alternating field Use of the coil S1 vary both the amplitude and the phase angle of the signal Uemp that is received by means of S2 and S3, which would be 90° out of phase with respect to Use in the absence of said field variation. The ranges of variation are indicated by arrows.

The further processing consists of the amplitude and the phase variation signal being vector-added. For this purpose, a 90° phase shift is introduced, for example by including a 90° phase advancer in the phase branch as shown in FIG. 5. The signals, which are phase-shifted by 90° with respect to each other, are composed into a vector sum signal SV by a summing unit that is contained in the comparator. Said vector sum signal SV does not only feature a phase angle of α and/or 0° with respect to the variation signals as a function of the material that is present in the conveyed stream, Rather, the absolute value of the sum vector SV is also a criterion for the amount of material that is present in the part to be detected.

Figure 7:
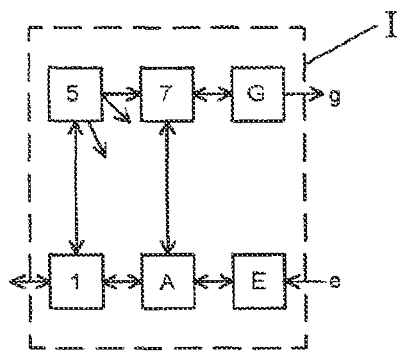
FIG. 7 shows an embodiment of printed circuit board I.
Figure 9:
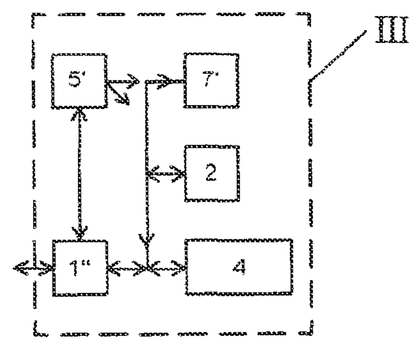
FIG. 9 shows an embodiment of printed circuit board III.
Figure 8:
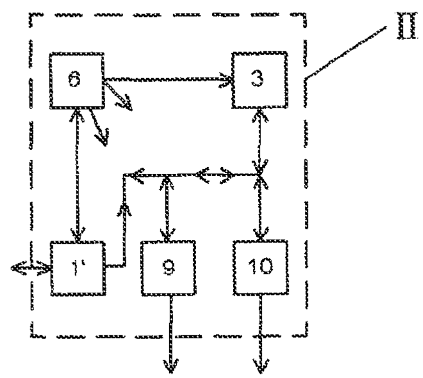
FIG. 8 shows an embodiment of printed circuit board II.

In the exemplary embodiment of the present invention whose circuit modules are shown in FIGS. 7, 8, and 9, the overall system is provided to be split into three circuit boards and/or circuit modules I, II, and III that are fitted with the individual circuit components.

The first circuit module and/or board I (FIG. 7) comprises a transmitter G, the receiver E (corresponds to OP in FIG. 5), and an analytical circuit A (corresponds to the section of circuitry A in FIG. 5 that is bordered by a dot-dashed line). As a transfer site for connection to the other circuit modules and/or boards, it is provided with an interface 1 to a bus system, preferably an Ethernet system, by means of which signals are received from other circuit modules and/or guided to other circuit modules.

The second circuit module and/or board II (FIG. 8), which can also be called the central sequence control system, contains a control module 3 which serves for control of the overall sequence and processes, for the other circuit modules, information that is entered or input by means of a control field 2 (see FIG. 9) and passes it on by means of an interface 1', and/or receives information from the other circuit modules. It is supplied with the detection signal from circuit module I as input signal by means of the bus system.

The third circuit board III (FIG. 9) is provided with a display facility 4, such as an LCD display, on which the actual set values and, if applicable, the actual status of the overall facility is displayed to the operating staff in generally conventional fashion. This circuit module also is provided with an interface 1" for connection to the bus system by means of which the exchange of information and control signals with the other circuit modules is effected.

Figure 1A:
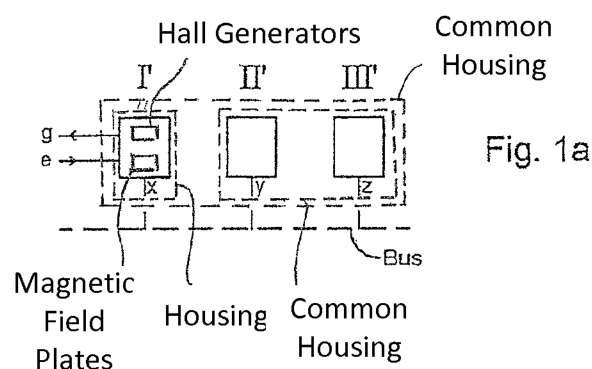
FIG. 1*a* shows a block diagram for illustration of the connection of the individual circuit modules.

Thus results an overall circuit scheme as shown in FIG. 1*a*. The exchange of data and information between the individual circuit modules is effected by means of a digital-type bus system, preferably by means of an Ethernet system, by means of the interfaces x, y, and z, which are connected to the circuit components 1, 1', and 1". This is facilitated by the circuit modules being provided with digital-type components. Only the transmitter of circuit module I emits an analog signal. However, said transmitter is provided with a digital-type frequency setting and can thus also be controlled in a digital fashion. Transmitters and/or oscillators of this type are also known by the technical term, “frequency synthesizers”, and are commercially available.

Moreover, each of the three circuit modules has a power supply module assigned to it that supplies the operating voltages, which usually differ from each other, to the individual components. The power supply modules 5 and 5' of the circuit boards I and III receive their supply and/or operating voltage from a central power supply 6 that is arranged on the circuit board II in the present exemplary embodiment and can be supplied from the public power supply.

In the exemplary embodiment, control modules 7, 7', so-called “controllers,” are also assigned to the circuit boards, in which control modules the setting values of the corresponding circuit board supplied by the bus system are stored and then used to trigger the corresponding setting of the various components of the corresponding circuit board. What is achieved by said storage is that, once the setting of the components on the individual circuit board is completed, the circuit module II can be set to be inactive with respect to setting the components and the activities of the circuit module II are essentially limited to the plant monitoring and information of the operator of the facility. For this purpose, the circuit board II is provided with two interfaces 9 and 10, of which, for example, interface 9 is used for connection of additional devices of the operator and interface 10 is used for connection of service facilities.

Figure 10:
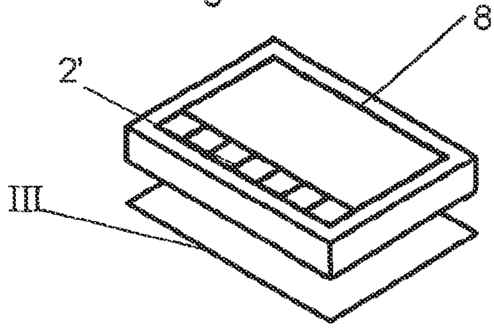
FIG. 10 shows a particular embodiment of printed circuit board III, in which the display facility and the control field are combined into one structural element.

It is particularly expedient for the display facility to be provided with generally conventional, so-called “touch-fields” since doing so simplifies the data exchange and signal flow. This is shown schematically in FIG. 10. An LCD display 8 featuring touch-fields 2' is affixed to circuit module III and connected to same by means of electrical leads that are not shown.

Connecting the individual circuit modules by means of a bus system affords not only a reduction of the influence of external disturbances. Rather, the bus system thus basically allows the circuit module of “workstation-control field/display facility” to be relocated from the overall facility to a site that is favorable from an ergonomic point of view without any major effort.

As shown in FIG. 1 in an exemplary fashion, the individual circuit modules are incorporated into the so-called detector housing in most cases. The development according to the example embodiments of the present invention makes it particularly easy to arrange the individual circuit modules of the overall plant in the overall plant according to ergonomic principles. Accordingly, it is feasible to arrange the circuit module including the generator, the receiver, and the analytical circuit in a corresponding recess of the detector housing that is accessible from outside and can be sealed by a lid of the housing, and to arrange the control field jointly with the display facility in a separate housing at a location that is easily accessible to the operating staff. Moreover, the influence of interfering fields on the overall circuitry is thus reduced significantly.

OVERVIEW OF REFERENCE NUMBERS AND CHARACTERS

A→Analog-type analytical circuit
AL→Power supply connection cable-
AZ→Amplitude branch
B→Conveyor belt
BP→Reference potential
C1, C2→Capacitors
ES→Detection signal of an interfering part
F→Metal foil
G→Alternating current generator
K→Comparator
M→Screw-nut
OP→Difference amplifier and/or operational amplifier
OT→Upper component of a facility for the detection of parts
PV→Phase discriminator
PZ→Phase branch
S1→Transmitter coil for generation of a field
S2, S3→Receiver coils for the electromagnetic field
SG→Rectifier module in amplitude branch AZ
SS→Detection signal module
U1, U2→Signals tapped at coils S2 and S3, respectively
Uemp→Signal received at the output of difference amplifier OP
Use→Signal of generator G
UT→Lower component of a facility for the detection of parts

1→Analog-to-digital converter
2→Analog amplifier
3→Digital-to-analog converter
4→Analytical unit
5→Alternating current generator (analog)
5'→Alternating current generator (digital)
6→Comparator
7→Filter
8→Digital-to-analog converter

The invention claimed is:

1. A system for generating a detection signal upon the presence of metallic-conducting parts in a conveyed flow that is at least largely non-conductive, comprising:

a first circuit module including a sensor unit and a digital analytical circuit, the sensor unit to detect variations of a magnetic field caused in a monitoring section by the part, and the analytic unit to derive a detection signal regarding the part;

a second circuit module including a control center that serves for overall control of other circuits and processing of information entered by means of a control field;

a third circuit module to which the detection signal from the first circuit module is supplied as an input signal and which includes a display facility including an associated control unit for display and setting of an operating status of the system; and a bus system to couple the first circuit module, the second circuit module, and the third circuit module for exchange of setting and information signals.

2. The system according to claim 1, wherein the bus system is an Ethernet system.

3. The system, according to claim 2, wherein the sensor unit of the first module includes an alternating current generator and a receiver coil system, the alternating current generator establishing via a transmitter coil system an alternating electromagnetic field in a section of the conveyed flow, which is to be monitored, whereby variations of the alternating electromagnetic field that are triggered upon passage of a part are detected by the receiver coil system and supplied to the analytical circuit for derivation of the detection signal.

4. The system according to claim 3, wherein the first circuit module is arranged in a housing that is accessible from outside and is sealed.

5. The system according to claim 1, wherein the sensor unit of the first circuit module includes a passive sensor unit with one of Hall generators or magnetic field plates.

6. The system according to claim 1, wherein the second circuit module and the third circuit module are arranged in one device housing.

7. The system according to claim 3, wherein the first circuit module, the second circuit module and the third circuit module are all arranged in one device housing that is specifically dedicated to the coils.

8. The system according to claim 1, wherein the display facility includes a display with touch-fields as at least one of control keys and setting keys.

9. The system according to claim 1, wherein each of the first circuit module, the second circuit module, and the third circuit module has a respective control module to set components of the respective circuit module assigned to it, and the control module is set from the control center via the bus system.

10. The system according to claim 1, wherein a bus connection between the circuit modules is provided in the form of a cable connection, which also contains conductors for supplying power to the first circuit module, the second circuit module, and the third circuit module in addition to the bus cable.

* * * * *

UNITED STATES PATENT AND TRADEMARK OFFICE

CERTIFICATE OF CORRECTION

PATENT NO. : 8,680,851 B2
APPLICATION NO. : 12/989290
DATED : March 25, 2014
INVENTOR(S) : Manfred Artinger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this
Twenty-ninth Day of September, 2015

Michelle K. Lee
*Director of the United States Patent and Trademark Office*